(12) United States Patent
Phan (10) Patent No.: US 7,770,058 B2
(45) Date of Patent: Aug. 3, 2010

(54) DISASTER RECOVERY WITHIN SECURE ENVIRONMENTS

(75) Inventor: Ricky Phan, Fairfield (AU)

(73) Assignee: Hewlett-Packard Development Company, L.P., Houston, TX (US)

(*) Notice: Subject to any disclaimer, the term of this patent is extended or adjusted under 35 U.S.C. 154(b) by 641 days.

(21) Appl. No.: 11/618,617

(22) Filed: Dec. 29, 2006

(65) Prior Publication Data

US 2007/0250738 A1 Oct. 25, 2007

Related U.S. Application Data

(63) Continuation-in-part of application No. 11/408,485, filed on Apr. 21, 2006.

(51) Int. Cl.
*G06F 11/00* (2006.01)

(52) U.S. Cl. .......................................................... 714/6

(58) Field of Classification Search ...................... 714/6
See application file for complete search history.

(56) References Cited

U.S. PATENT DOCUMENTS

| | | | | |
|---|---|---|---|---|
| 5,592,618 | A * | 1/1997 | Micka et al. | 714/54 |
| 6,092,066 | A * | 7/2000 | Ofek | 707/10 |
| 6,389,552 | B1 * | 5/2002 | Hamilton et al. | 714/4 |
| 6,442,709 | B1 | 8/2002 | Beal et al. | 714/33 |
| 6,732,294 | B2 * | 5/2004 | Mackrory et al. | 714/25 |
| 7,020,697 | B1 * | 3/2006 | Goodman et al. | 709/223 |
| 7,139,782 | B2 * | 11/2006 | Osaki | 707/204 |
| 7,139,885 | B2 * | 11/2006 | Yamagami | 711/162 |
| 7,194,616 | B2 * | 3/2007 | Axnix et al. | 713/100 |
| 7,302,540 | B1 * | 11/2007 | Holdman et al. | 711/162 |
| 7,383,463 | B2 * | 6/2008 | Hayden et al. | 714/4 |
| 7,451,345 | B2 * | 11/2008 | Butterworth et al. | 714/6 |
| 7,467,198 | B2 * | 12/2008 | Goodman et al. | 709/223 |
| 7,475,204 | B2 * | 1/2009 | Buah et al. | 711/161 |
| 2003/0120914 | A1 * | 6/2003 | Axnix et al. | 713/100 |
| 2003/0126388 | A1 * | 7/2003 | Yamagami | 711/162 |
| 2003/0126389 | A1 * | 7/2003 | Mackrory et al. | 711/162 |
| 2004/0172528 | A1 | 9/2004 | Tenereillo | 713/153 |
| 2004/0193476 | A1 * | 9/2004 | Aerdts | 705/10 |
| 2004/0260736 | A1 * | 12/2004 | Kern et al. | 707/204 |
| 2005/0193245 | A1 * | 9/2005 | Hayden et al. | 714/13 |
| 2006/0020530 | A1 * | 1/2006 | Hsu et al. | 705/35 |
| 2006/0075148 | A1 * | 4/2006 | Osaki | 710/5 |
| 2006/0123208 | A1 * | 6/2006 | Johnson | 711/162 |
| 2006/0143194 | A1 * | 6/2006 | Stewart et al. | 707/100 |
| 2006/0195340 | A1 * | 8/2006 | Smitherman et al. | 705/2 |
| 2007/0226437 | A1 * | 9/2007 | McClure | 711/162 |
| 2007/0294493 | A1 * | 12/2007 | Buah et al. | 711/156 |
| 2008/0109804 | A1 * | 5/2008 | Bloomstein et al. | 718/1 |
| 2008/0114792 | A1 * | 5/2008 | LaMonica | 707/100 |
| 2008/0148097 | A1 * | 6/2008 | Johnson | 714/6 |
| 2008/0209258 | A1 * | 8/2008 | Casale et al. | 714/4 |
| 2008/0263079 | A1 * | 10/2008 | Soneji et al. | 707/102 |
| 2008/0301494 | A1 * | 12/2008 | Butterworth et al. | 714/6 |

* cited by examiner

*Primary Examiner*—Robert Beausoliel
*Assistant Examiner*—Joshua P Lottich (57) ABSTRACT

Systems and processes include a disaster recovery system for a production site. The disaster recovery site may include replications of at least a portion of information and/or applications from the production site. Requests for the production site may be redirected to the disaster recovery site according, as appropriate. The disaster recovery site may be tested while without substantially inhibiting operation of the production site

19 Claims, 8 Drawing Sheets

DISASTER RECOVERY WITHIN SECURE ENVIRONMENTS

CLAIM OF PRIORITY

This application is a continuation-in-part of U.S. patent application Ser. No. 11/408,485 entitled "System and Method for Uniform Disaster Recovery System Access" filed on Apr. 21, 2006, the entire contents of which are hereby incorporated by reference.

TECHNICAL FIELD

The present invention relates to disaster recovery systems and processes, more and particularly to disaster recovery systems and processes in secure environments.

BACKGROUND

Businesses rely on data processing systems to manage a wide range of internal and external functions, including accounting and inventory functions, data management functions, and many others. Further, many of these systems must be available to be accessed over local or wide-area data processing system networks, including both private networks and public networks such as the internet In the event of a "disaster," which can include both actual natural disasters and other events, a primary system may be "down" or otherwise unavailable, which can be costly and damaging. In response, many businesses and other enterprises maintain "disaster recovery" systems or environments, which can include redundant systems that provide some or all of the functions of the primary systems, and typically include full backups of all the data available to the primary systems. In this way, in the event of a disaster, users can transition to the disaster recovery environment until the primary system can be restored, thus minimizing lost productivity.

Unfortunately, there is currently no uniform and reliable way for a user to effectively contact the disaster recovery environment in the event of a disaster, and no standard and effective way for the disaster recovery system to be tested on a routine basis without disrupting operation of the primary system. There is, therefore, a need in the art for a system and method for uniform disaster recovery system access.

SUMMARY

Systems and processes may include a disaster recovery system for a secure environments such as Network Perimeter Services (NPS) (e.g., production site). Production sites may include, for example, corporate intranets, websites for commercial transactions, websites for financial products, etc. The disaster recovery site may include replications of at least a portion of information and/or applications from the production site. Thus, users may access the disaster recovery site to perform a least a portion of the functions allowed on the production site in the event of an inaccessible production site or a disaster. Requests for the production site may be redirected to the disaster recovery site according, as appropriate. The disaster recovery site may be tested while without substantially inhibiting operation of the production site. Allowing testing of the disaster recovery site while maintaining operation of the production site may allow testing to be performed without interrupting service from the production site, during normal business hours, more frequently since service may not be interrupted to users of a production site.

In one general aspect, a disaster recovery site coupled to a production site may be provided and testing of the disaster recovery site may be allowed while the production site substantially continues operations. The disaster recovery site includes information from the production site. The disaster recovery site and the production site may be secure sites. A request for a production site may be received and a forwarding rule may be applied to the request. The request may be redirected to the disaster recovery site if criteria of the forwarding rule have been satisfied.

Implementations may include one or more of the following features. The disaster recovery system may replicate information stored on a storage area network of the production site. Replication of information on the storage area network of the production site may be terminated during testing of the disaster recovery site. Access to the disaster recovery site may be allowed such as access at least one of a storage area network of a disaster recovery site, an application server, a proxy server, or a database server. The forwarding rule may redirect requests for the production site to the disaster recovery site if a disaster event has occurred and/or redirect requests for the production site to the disaster recovery site if notice of a disaster event has been received. Access to the production site may be allowed if criteria of the forwarding rule have not been satisfied.

In another general aspect, a disaster recovery site coupled to a production site may be provided, where the disaster recovery site includes information from the production site. The disaster recovery site and the production site may be secure sites. A request for disaster recovery site may be received and a determination may be made whether the request is for testing the disaster recovery site. The coupling between the disaster recovery site and the production site may be terminated, if the request is for testing the disaster recovery site. The production site may substantially continue to operate if the request is for testing the disaster recovery site. Access to the disaster recovery site may be allowed.

Implementations may include one or more of the following features. The request may be for testing the disaster recovery site and the disaster recovery site may be tested. A net cache of the disaster recovery site may be tested, if the request is via an intranet. Global switch services may be tested if the request is via the Internet. A storage area network of the disaster recovery site may be tested, such as by determining whether the storage area network satisfies recovery criteria. Allowing access to the disaster recovery site may include allowing access to a storage area network of the disaster recovery site and/or executing one or more applications residing on the disaster recovery site.

In another general aspect, data may be transmitted from a storage area network of a production site to a storage area network of a disaster recovery site and the disaster recovery site and the production site may be secure sites. A request for the disaster recovery site may be received and a determination may be made whether the request for the disaster recovery site is for testing of the disaster recovery site. The coupling between the production site and the disaster recovery site may be terminated, if the request was for testing the disaster recovery site and access to the disaster recovery site may be allowed.

Implementations may include one or more of the following features. A request for the disaster recovery site may include a redirected request for the production site. A redirected request may be redirected from the production site to the disaster recovery site due to a disaster event. Access to the storage area network and/or an application server of the disaster recovery site may be allowed.

In one general aspect, a first uniform resource locator associated with a first network address and a second uniform resource locator associated with a second network address may be stored, the first network address may be returned in response to calls for the first uniform resource locator when the primary server data processing system is operating normally, and the second network address may be returned in response to calls for the first uniform resource locator when the primary server data processing system is unavailable (i.e. in the event of a "disaster"). The first network address may correspond to a primary server data processing system and the second network address may correspond to a disaster recovery server data processing system. During testing, the second network address may be returned in response to calls for the second uniform resource locator while the primary server data processing system is operating normally.

The details of one or more implementations are set forth in the accompanying drawings and the description below. Other features will be apparent from the description, the drawings, and from the claims.

DESCRIPTION OF DRAWINGS

Like reference symbols in the various drawings indicate like elements.

DETAILED DESCRIPTION

Production sites (e.g., websites, intranet sites, etc.) may operate for a variety of commercial and noncommercial purposes. Businesses may rely on operations of a production site for transactions, record keeping, customer service, day-to-day operations, and for a variety of other purposes. Therefore, production site unavailability due to disasters (e.g., natural disasters such as fire, hurricanes, floods, tornados, tsunamis, etc. or other disasters such as terrorism, viruses, hackers, etc.) my affect the operations of a business. A disaster recovery (DR) system may be established for the production site to accommodate users while the production site is unavailable.

Figure 1A:
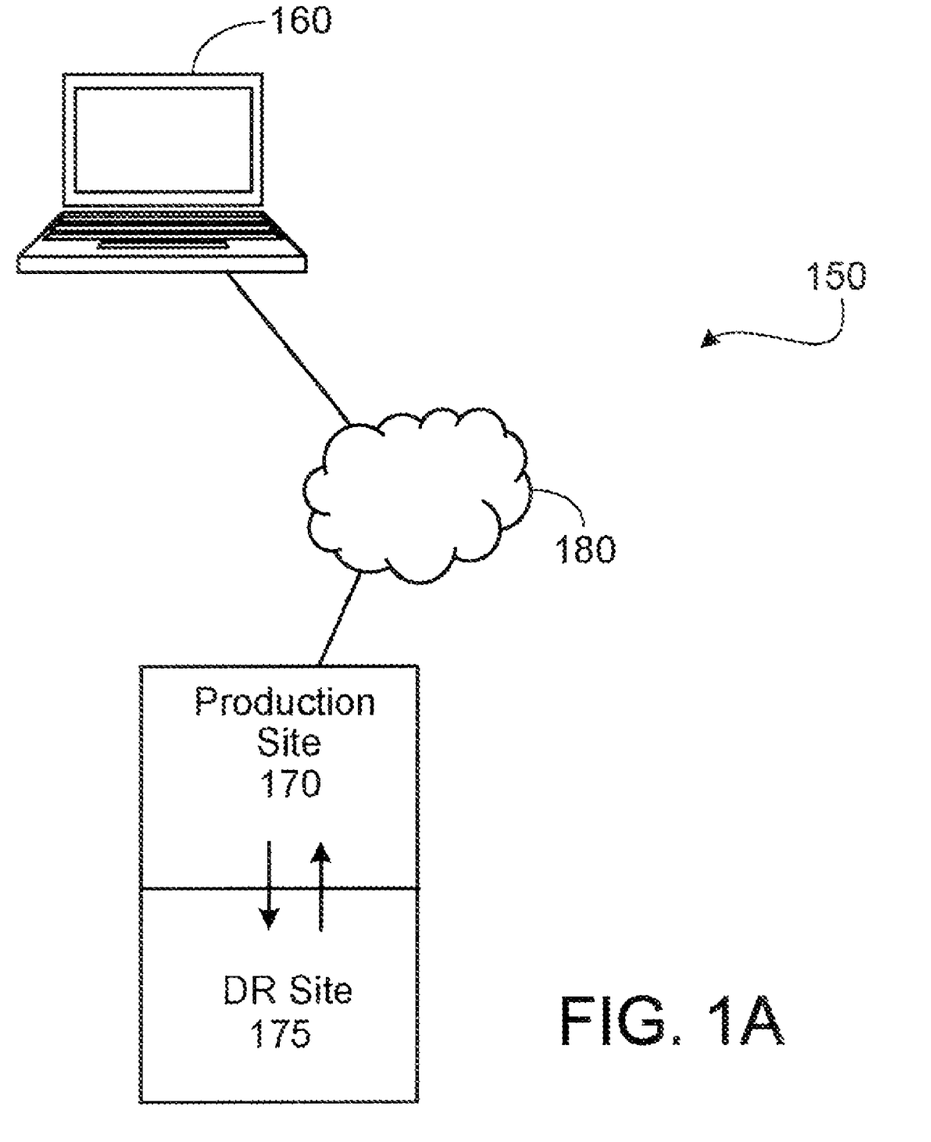
FIG. 1A illustrates an example of a disaster recovery system.

FIG. 1A illustrates an example system 150. System 150 may include a computer system 160 used to access as a production site 170 via a network 180. Computer system 160 may be a personal computer, a laptop, a personal digital assistant (PDA), or a smart phone. A user may access production site 170 from computer system 160.

A DR site 175 may be coupled to production site 170 via a bus (e.g., serial, parallel, FireWire, or USB) or using a network protocol (TCP/IP, Wi-Fi, 802.11g, 802.11n, IR or Bluetooth). DR site 175 and production site 170 may be removably coupled. For example the connection between DR site 175 and production site 170 may be terminated or uncoupled. A connection between DR site 175 and production site 170 may be terminated to increase accuracy of DR site testing and to inhibit problems (e.g., virus, hacking, etc.) with the production site from affecting the DR site.

DR site 175 may replicate at least a portion of the information from production site 170. For example, DR site 175 may retrieve data from production site 170 and/or production site may transmit data to the DR site for replication. DR site 175 may also include at least a portion of the same or similar applications accessible on production site 170.

Forwarding rules may redirect a user from production site 170 to DR site 175 as appropriate. For example, forwarding rules may redirect a user from production site 170 when a production site is unavailable or a disaster has occurred. A user may utilize DR site to perform similar operations as on the production site or to access data stored on the production site.

Figure 1B:
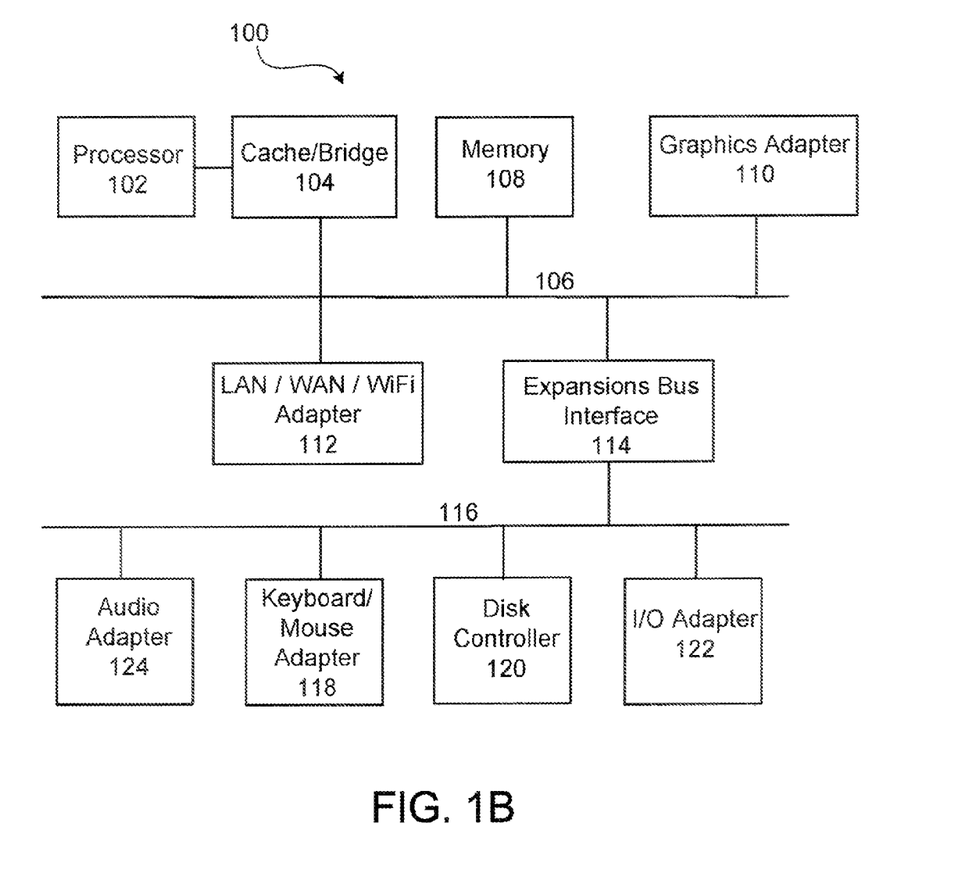
FIG. 1B illustrates an example of a data processing system.

Production site and DR site may be hosted by a server or other computer system. The computer system described may include computer systems similar to the example of a data processing system 100 illustrated in FIG. 1B. The data processing system 100 includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc. Other peripheral devices, such as an optical disk drive and the like, also may be used in addition or in place of the hardware illustrated in FIG. 1B.

A data processing system may includes an operating system (e.g., Microsoft Windows, commercially available from Microsoft Corporation in Richmond, Wash.) with a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

Figure 2:
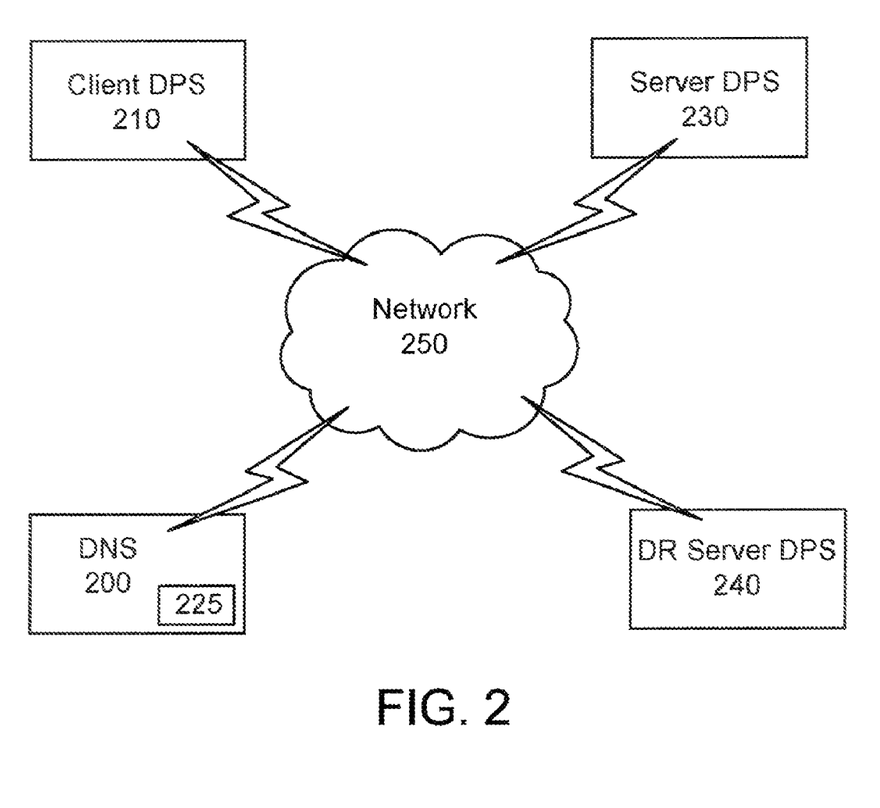
FIG. 2 illustrates an example data processing system network.

FIG. 2 illustrates an example data processing system network. FIG. 2 depicts client data processing system 210, domain name server (DNS) 220, server data processing system 230, and disaster-recovery (DR) server data processing system 240, all connected to communicate with network 250. Network 250 can be implemented using any known public or private data processing system network, or can be more than one network configured to communicate with each other, and can include the Internet. Each of the data processing systems 210, 220, 230, and 240 can be implemented, as in data processing system 100, or can be modified.

Client data processing system 210 may be a data processing system connected to communicate with network 250, and thereby to communicate with various other network-connected systems. Data processing system 210 may include an internet browser, such as Microsoft Internet Explorer, commercially available from Microsoft Corporation (Richmond, Wash.).

Domain name server (DNS) system 220, represented as a single block may include a single or multiple different servers, such as a local DNS server, a root server, a top level domain name server, or a combination thereof which may act together to resolve domain names and uniform resource locators (URLs) into the corresponding internet protocol (IP) addresses.

Server data processing system 230 can represent any server system or a combination of multiple systems that deliver data or other services over the network 250. DR server data processing system 240, is a redundant backup system(s) to server data processing system 230 that is capable of delivering or performing some or all of the same services as server data processing system 230 in the event that server data processing system is unavailable over network 250.

DNS 220 includes one or more DNS entries in a storage 225 indicating the URL addresses and corresponding IP addresses for server data processing system 230, which will be referred to herein as production URLs. Furthermore, DNS 220 may include one or more secondary URLs, referred to herein as disaster recovery URLS or DR URLs, corresponding to the production URLs, that indicate instead the IP address(es) of DR server data processing system 240.

By defining corresponding production URLs and DR URLs in the DNS 220 to point to the IP addresses of the server data processing system 230 and DR server data processing system 240, respectively, users can be assured of a means for readily contacting the DR server data processing system 240 for either testing purposes or in the event that server data processing system 230 is unavailable. DNS 220 is configured to return the IP address of the server data processing system 230 in response to calls for the production URL when the server data processing system is operating normally, to return the IP address of the server data processing system 240 in response to calls for the production URL when the server data processing system 230 is unavailable. For purpose of testing, preferably, the DR URL in the DNS 220 points to the IP addresses of the DR server data processing system 240 whether or not the server data processing system 230 is operating normally.

In some implementations, two URLs may be defined in the DNS for each server system instead of one, i.e., a DR URL and a production URL, to point to a DR IP address and production IP address respectively.

The DR URL can be used to testing the DR server data processing system 240. In the event of a "disaster" or other unavailability of server data processing system 230, the DNS entry in DNS 220 for production URL is updated to point to the IP address of the DR data processing server 240, which may allow seamless replacement. The DNS 220 can store the IP address of the DR data processing server 240 associated with the production URL when the server data processing system 230 is unavailable.

In some implementations, the DR URLs may utilize an identifier for a standard naming convention. For example, the term "DR" is placed in front of the production URL to form the DR URL. A standard internet web URL such as http://dr.example.com, the hierarchical order of the five elements is com (generic top-level domain)—example (second-level domain)—dr (subdomain). If a production URL has been defined as http://example.com then the DR URL is defined as http://dr.example.com, using "dr" as the subdomain. As another example, for a server located at URL http://example.com, the corresponding DR URL includes the dr subdomain, http://dr.example.com.

The DR URL may be any suitable URL and achieve at least some of the same results. For example, a DR URL may be formed by modifying or changing the production URL by adding another word or character in front of the production URL. By pointing the DR URL to the DR server data processing system, similar results will be achieved. However, the use of a consistent naming convention for DR URLs as described above may encourage a smooth transition to the DR servers in the event that becomes necessary. In some implementations, particularly when a uniform naming convention is used for the DR server, the DNS server can associate the production URL with both the network address of the production server and the network address of the DR server, and automatically redirect calls to the DR server when the production server is unavailable or when the DR URL or URL subdomain is used.

Figure 3:
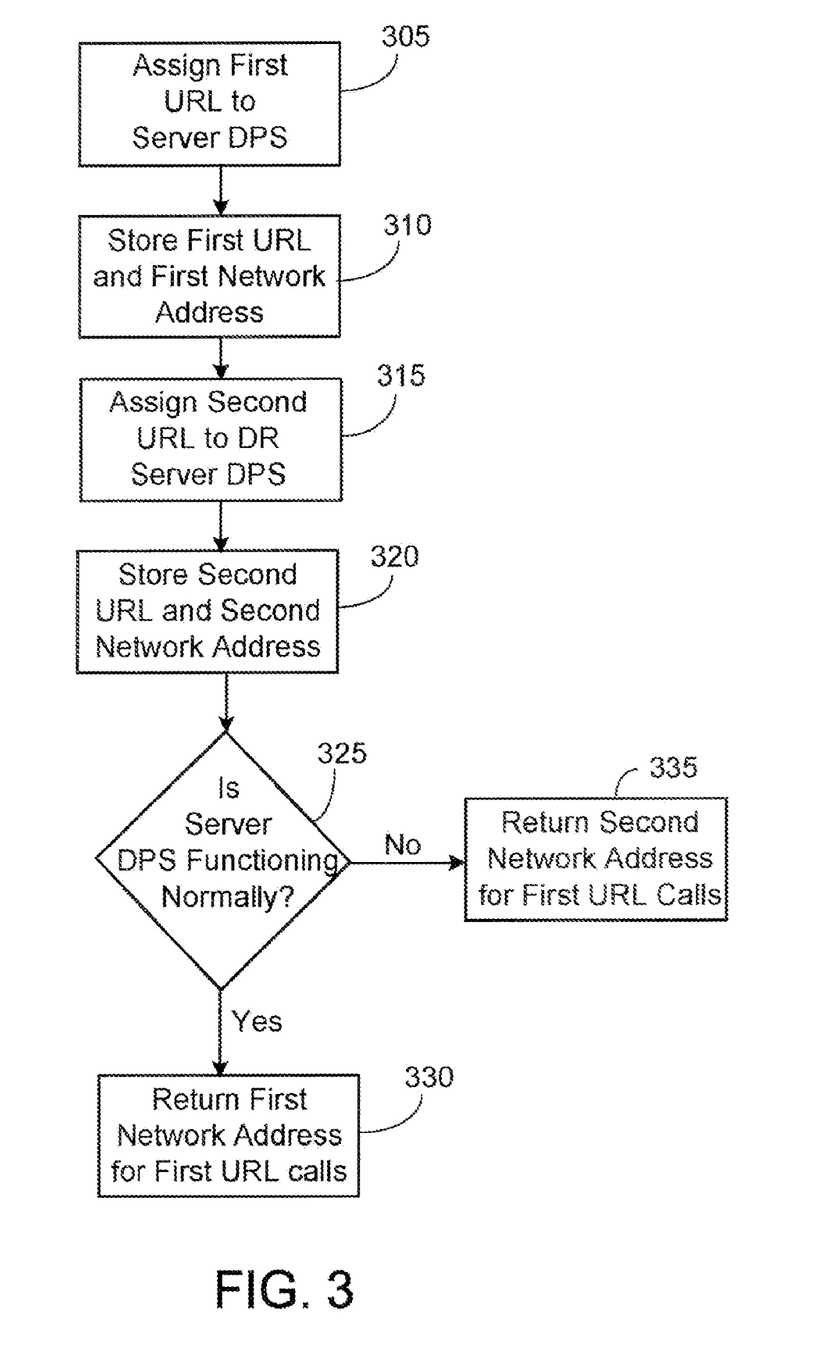
FIG. 3 illustrates an example process for establishing a disaster recovery system.

FIG. 3 depicts a flowchart of a process for a disaster recovery system. A first URL (e.g., production URL) is assigned to a server data processing system (operation 305). The first URL is stored with a first network address corresponding to the server data processing system (operation 310). The URL and the first network address are stored in a DNS server, and the first network address is an IP address. The server data processing system is a production data processing system.

A second URL (e.g., DR URL) is assigned to a DR server data processing system (operation 315), which is a backup system for some of all of the functions of the server data processing system. The second URL is stored with a second network address corresponding to the DR server data processing system (operation 320). The DR URL and second network address are stored in a DNS server, and the second network address is an IP address.

The second URL may be substantially similar to the first URL, with a "dr" subdomain indicator indicating it is the URL address for the disaster recovery system. If the server data processing system is operating normally (operation 325), calls to the first URL are directed to the first network address (operation 330). If the production server data processing system is unavailable (e.g., in the event of a "disaster"), then calls to the first URL are directed to the second network address (step 335). For example, the DNS record associated with the first URL may be updated to indicate the second network address.

Figure 4:
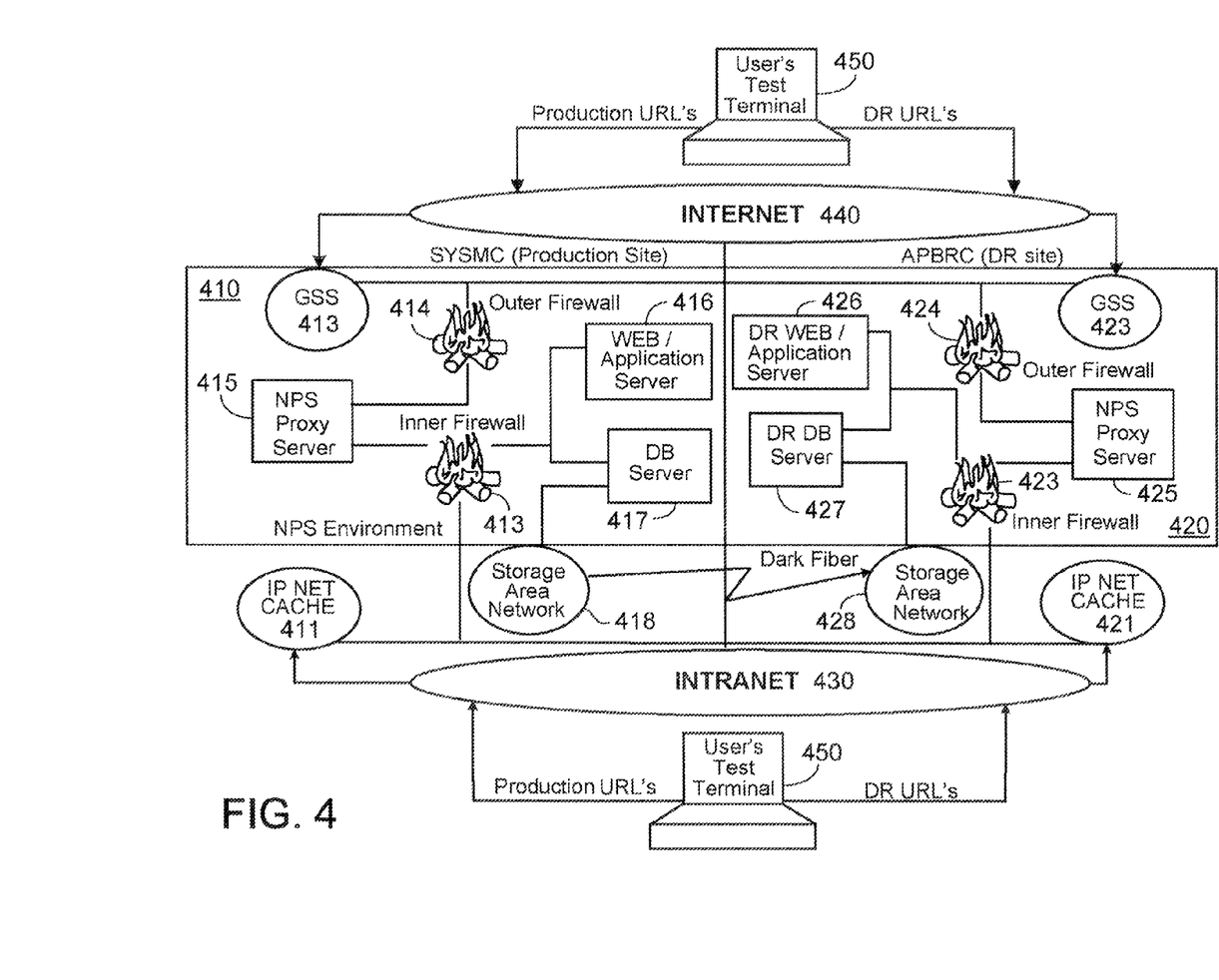
FIG. 4 illustrates an example disaster recovery system for a secure environment.

FIG. 4 illustrates an example of disaster recovery system 400 within a network perimeter services (NPS), a secure network environment. Disaster recovery system 400 includes a secure production site 410 and a secure DR site 420. Secure sites may restricting access to the site based on one or more security protocols. For example, a site may require submission of logon information (e.g., user name, password, fingerprint, cornea scan, etc.) Firewalls and/or other security software and/or hardware may prevent unauthorized access to the secure sites.

Production site 410 may be accessible via intranet 430 or the Internet 440. User may access production site 410 via a computer system such as terminal 450. A user may access production site 410 using Production URLs defined in IP Net Cache 411 that forwards users access from intranet 430 to the production site. The user may then need appropriate permissions (e.g., valid user logon information) to pass the inner firewall 412. Additionally, a user may access production site 410 using Production URLs defined in global switching system (GSS) 413 that forwards users access from Internet 440 to the production site. The user may also need the appropriate permissions to pass the outer firewall 414 after being directed from GSS 413. A user may access servers and repositories of production site 410 via NPS Proxy Server 415.

Once access to production site 410 has been obtained; the user may access servers 416, such as web servers and application servers and/or database servers 417 which may provide access to storage area network 418. Various applications may be executed on a server coupled to the production site from the application servers. Storage area network may include various forms of memory such as volatile (e.g., RAM) and/or nonvolatile memory (e.g., optical memory, magnetic memory, flash memory, EEPROM, PRAM, or FeRAM). Memory of storage area network may include repositories such as SQL databases, relational databases, object oriented databases, distributed databases, XML databases, and/or web server repositories.

DR site 420 may be accessed during periods of production site unavailability, during testing, and/or to modify content on the DR site. DR site 420 may be accessible via intranet 430 or the Internet 440. User may access the DR site 420 via a computer system such as terminal 450. A user may access DR site 420 using DR URLs defined in IP Net Cache 421 that forwards users access from intranet 430 to the DR site. The user may then need appropriate permissions (e.g., valid user logon information) to pass the inner firewall 422. Additionally, a user may access DR site 420 using DR URLs defined in global switching system (GSS) 423 that forwards user access from Internet 440 to the DR site. The user may also need the appropriate permissions to pass the outer firewall 424 after being directed from GSS 423. A user may access servers and repositories of DR site 420 via NPS Proxy Server 425.

Once access to DR site 420 has been obtained; the user may access servers 426, such as web servers and application servers and/or database servers 427 which may provide access to storage area network 428. Various applications may be executed on a server coupled to the DR site from the application servers.

Storage area network may include various forms of memory such as volatile (e.g., RAM) and/or nonvolatile memory (e.g., optical memory, magnetic memory, flash memory, EEPROM, PRAM, or FeRAM). Memory of storage area network may include repositories such as SQL databases, relational databases, object oriented databases, distributed databases, XML databases, and/or web server repositories.

Storage area network 418 of the production site may replicate (in one direction) portion of its information onto storage area network 428 of the DR site. Storage area network 428 may replicate data from the storage area network 418 of production site 410 according to recovery criteria, such as time by which data from the storage area network of the production site must be replicated.

Storage area network 428 of DR site 420 may be coupled to the storage area network 418 of production site 410 via bus (e.g., serial, parallel, FireWire, or USB), optical fiber, or one or more network protocols (TCP/IP, Wi-Fi, 802.11g, 802.11n, IR or Bluetooth). A connection between storage area network 428 of DR site 420 and storage area network 418 of production site 410 may be split, terminated, or disconnected. A connection between storage area network 428 of DR site 420 and storage area network 418 of production site 410 may be terminated to inhibit problems affecting the production site from affecting the DR site, to test the DR site, and/or by a disaster occurring.

Figure 5:
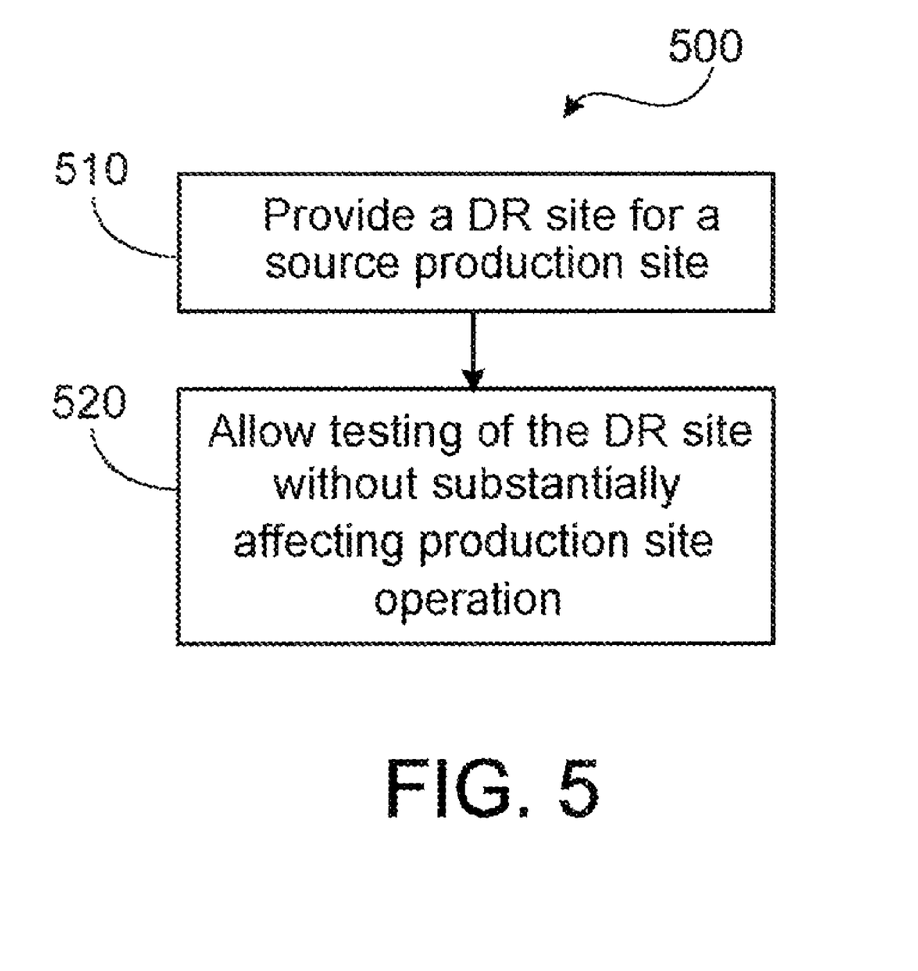
FIG. 5 illustrates an example process for allowing testing of a disaster recovery system.

FIG. 5 illustrates an example process 500 for a disaster recovery system, such as disaster recovery system 150 illustrated in FIG. 1A. A DR site may be provided for a secure production site (operation 510). Testing of the DR site may be allowed without substantially affecting the production site operation (operation 520). For example, when a users access the Vipro Multi bank Web View system (i.e. http://dr.Multibank.combank.com.au) via the Intranet, the user will be forwarded to the NPS Proxy server via the inner firewall defined by the forwarding rules in the IP Net Cache. Thus testing of the DR site in isolation will be achieved, where the application servers and/or database servers provide access to storage area network. As another example, if the users access the Vipro Multi bank Web View system (i.e. http://dr.Multibank.combank.com.au) via the Internet. The users will be forwarded to the NPS Proxy server via the outer firewall defined by the forwarding rules in the GSS devices.

Figure 6:
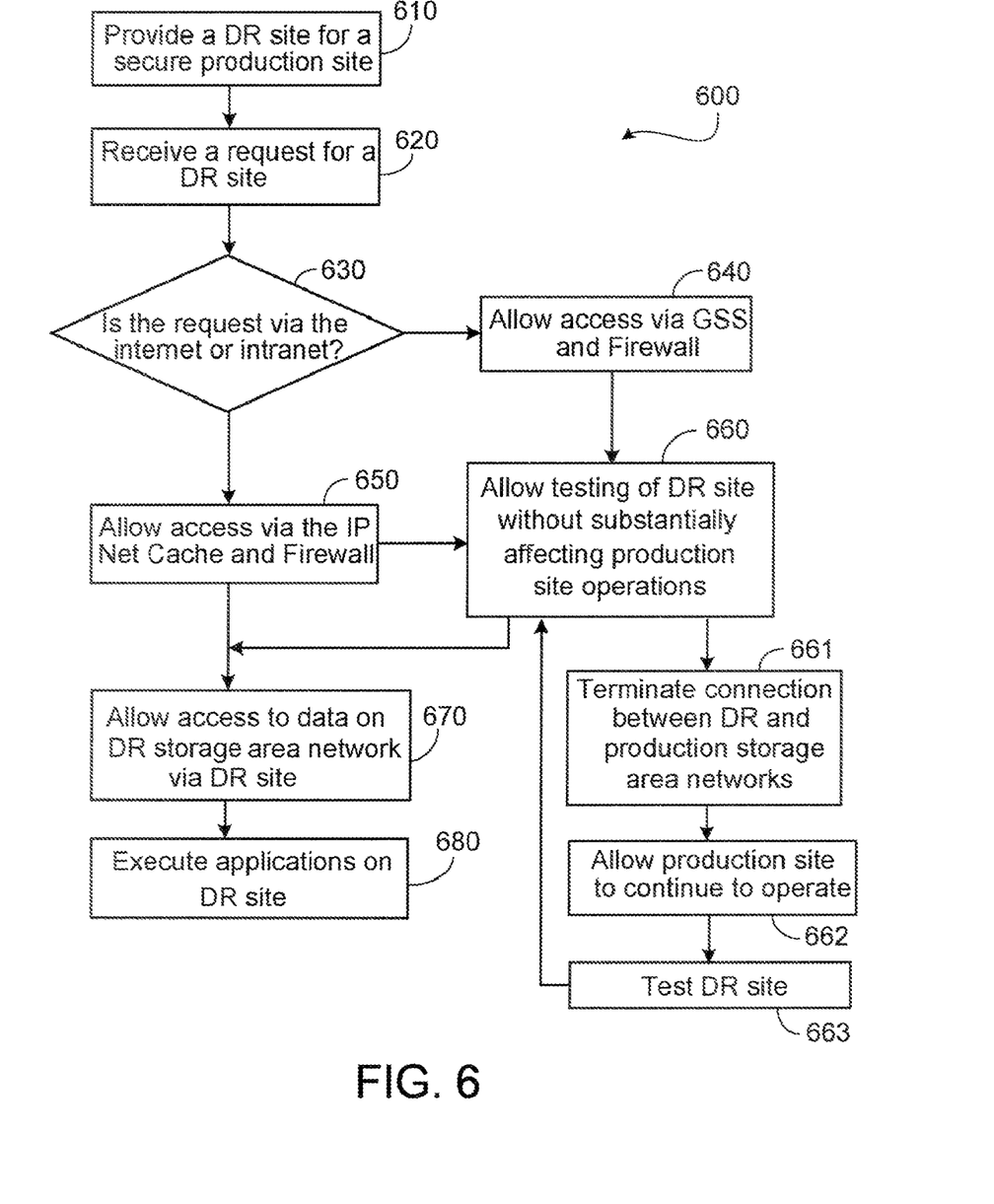
FIG. 6 illustrates an example process of a disaster recovery system.

FIG. 6 illustrates an example of a processes 600 performed by a disaster recovery system, such as disaster recovery system 100. A DR site may be provided for a secure production site (operation 610). A request for a DR site may be received (operation 620). For example, a user (e.g., using terminal 450) may enter a DR URLs for a DR site in a web browser application. A determination may be made whether the request is via the Internet or via intranet (operation 630). If the request is via the internet, access to the DR site may be provided via GSS and outer firewall (operation 640). If the request is via intranet, access to the DR site may be provided via IP Net Cache and inner firewall (operation 650).

Testing of the DR site may be allowed without substantially affecting production site operations (operation 660). Testing may be allowed by terminating the connection between the DR site and the production storage area networks (operation 661). Production site may be allowed to continue to operate during testing of the DR site (operation 662) and one or more tests may be performed on the DR site (operation 663). For example, the ability access to data from servers and/or storage area networks, the ability to execute applications residing on the DR site, and/or various components of the DR site may be tested. Testing may allow verification and/or certification according to business, industry, and/or governmental guidelines that the DR site is performing as desired.

Access to data on the storage area networks may be allowed via the DR site once access via the IP Net Cache and/or GSS is allowed (operation 670). Applications may also be executed on the DR site (operation 680). Applications executable on the DR site may be the same or similar to applications available on the production site.

Figure 7:
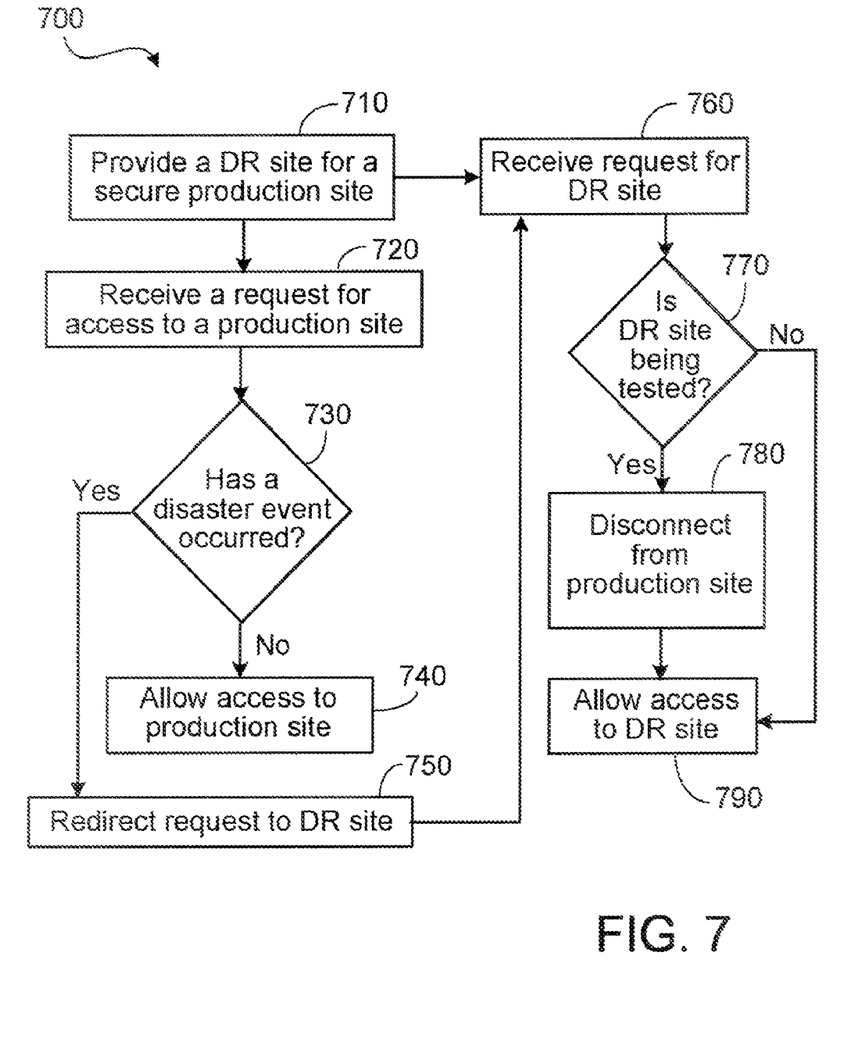
FIG. 7 illustrates another example process of a disaster recovery system.

FIG. 7 illustrates an example of a process 700 for accessing a production site. A DR site may be provided for a secure production site (operation 710). A request may be received for access to a production site (operation 720). A determination may be made whether a disaster event has occurred (operation 730). For example, a notice may be received that a disaster even has occurred. As another example, at least a portion of the production site may be unavailable or malfunctioning.

If a disaster event has not occurred, then access to the production site is allowed (operation 740). If a disaster event has occurred, then the request may be redirected to the DR site (operation 750).

A request for the DR site may be received (operation 760) directly or due to redirection from the production site (operation 750). A determination may be made whether the DR site is being tested (operation 770). If the DR site is being tested, the DR site may be disconnected from the production site (operation 780) prior to allowing access to the DR site (operation 790). If the DR site is not being tested, access to the DR site may be allowed (operation 790). Once the DR site is accessed, data may be accessed and/or various applications may be executed.

Although a user has been described as a human, a user may be a person, a group of people, a person or persons interacting with one or more computers, and/or a computer system, as appropriate.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer (e.g., host or external host) having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to interact with a user as well. For example, feedback provided to the user by an output device may be any form of sensory feedback (e.g., visual feedback, auditory feedback, and/or tactile feedback) and/or input from the user may be received in any form, including acoustic, speech, or tactile input.

The systems and techniques described here can be implemented in a computing system that includes a back end component (e.g., as a data server), a middleware component (e.g., an application server), a front end component (e.g., a client computer with a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and a server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. Among other modifications, the described operations may be performed in a different order than is described and some operations may be added or deleted. Accordingly, other implementations are within the scope of this application.

It is to be understood the implementations are not limited to particular systems or processes described. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a processor" includes a combination of two or more processors and reference to "a server" includes of different types of servers.

What is claimed is:

1. A method comprising:
    replicating information stored on a production site on to a disaster recovery site coupled to the production site, wherein the disaster recovery site and the production site include mechanisms to restrict access;
    allowing testing of the disaster recovery site while allowing the production site to substantially continue operations;
    terminating replication of said information from the production site to the disaster recovery site during testing of the disaster recovery site;
    receiving a request for access to data on a production site;
    applying a forwarding rule to the request;
    redirecting the request to the disaster recovery site if criteria of the forwarding rule have been satisfied; and
    testing global switch services if the request is via the Internet.

2. The method of claim 1 wherein said information stored on the production site is stored on a storage area network of the production site.

3. The method of claim 1 further comprising allowing access to the disaster recovery site.

4. The method of claim 3 wherein allowing access to the disaster recovery site includes allowing access to at least one of a storage area network of a disaster recovery site, an application server of a disaster recovery site, a proxy server of a disaster recovery site, or a database server of a disaster recovery site.

5. The method of claim 1 wherein applying the forwarding rule includes determining if a disaster event has occurred, and redirecting requests for the production site to the disaster recovery site if a disaster event has occurred.

6. The method of claim 1 wherein applying the forwarding rule includes determining if notice of a disaster event has been received, and redirecting requests for the production site to the disaster recovery site if the notice has been received.

7. The method of claim 1 allowing access to the production site if criteria of the forwarding rule has not been satisfied.

8. The method of claim 1 further comprising testing a net cache of the disaster recovery site if the request is via an intranet.

9. A method comprising:
    receiving a request for access to data on a disaster recovery site coupled to a production site, wherein the disaster recovery site includes information from the production site, and wherein the disaster recovery site and the production site include mechanisms to restrict access;
    determining if the request is for testing the disaster recovery site;
    terminating the coupling between the disaster recovery site and the production site, if the request is for testing the disaster recovery site;

allowing the production site to substantially continue operating, if the request is for testing the disaster recovery site;

allowing access to the disaster recovery site, in response to the request; and testing a net cache of the disaster recovery site if the request is via an intranet.

10. The method of claim 9 further comprising testing global switch services if the request is via the Internet.

11. The method of claim 9 further comprising testing a storage area network of the disaster recovery site.

12. The method of claim 11 wherein testing a storage area network includes determining whether the storage area network satisfies recovery criteria.

13. The method of claim 9 wherein allowing access to the disaster recovery site includes allowing access to a storage area network of the disaster recovery site.

14. The method of claim 9 wherein allowing access to the disaster recovery site includes executing one or more applications residing on the disaster recovery site.

15. A machine-readable medium storing instructions for a disaster recovery system to perform operations comprising:

transmitting data from a storage area network of a production site to a storage area network of a disaster recovery site, and wherein the disaster recovery site and the production site include mechanisms to restrict access;

receiving a request for data on the disaster recovery site;

determining if the request for the disaster recovery site was for testing of the disaster recovery site;

terminating the coupling between the production site and the disaster recovery site, if the request is for testing the disaster recovery site;

allowing access to the disaster recovery site in response to the request; and testing a net cache of the disaster recovery site if the request is via an intranet.

16. The machine-readable medium of claim 15 wherein receiving a request for the disaster recovery site comprises receiving a redirected request for the production site, wherein the redirected request was redirected from the production site to the disaster recovery site due to a disaster event.

17. The machine-readable medium of claim 15 wherein instructions for a disaster recovery system to perform operations further comprise allowing access to the storage area network of the disaster recovery site.

18. The machine-readable medium of claim 15 wherein instructions for a disaster recovery system to perform operations further comprise allowing access to an applications server of the disaster recovery site.

19. The machine-readable medium of claim 15 wherein instructions for a disaster recovery system to perform operations further comprise testing global switch services if the request is via the Internet.

* * * * *